United States Patent
Catterall et al.

(10) Patent No.: US 9,659,036 B2
(45) Date of Patent: *May 23, 2017

(54) ADAPTIVE RELATIONAL DATABASE ACCESS

(75) Inventors: Roy Antony Catterall, Perth (AU);
Allan Thomas Chandler, Perth (AU);
Alan David Place, Perth (AU); Mark Andrew Shewell, Perth (AU); Stephen James Yates, Perth (AU)

(73) Assignee: International Business Machines Corporation, Armonk, NY (US)

( * ) Notice: Subject to any disclaimer, the term of this patent is extended or adjusted under 35 U.S.C. 154(b) by 545 days.

This patent is subject to a terminal disclaimer.

(21) Appl. No.: 13/600,584

(22) Filed: Aug. 31, 2012

(65) Prior Publication Data

US 2012/0323845 A1 Dec. 20, 2012

Related U.S. Application Data

(63) Continuation of application No. 12/748,943, filed on Mar. 29, 2010, now Pat. No. 8,335,804.

(51) Int. Cl.
*G06F 17/30* (2006.01)

(52) U.S. Cl.
CPC .. *G06F 17/30286* (2013.01); *G06F 17/30297* (2013.01)

(58) Field of Classification Search
CPC .............. G06F 17/30286; G06F 17/30297
USPC ........................................ 707/803, 802, 705
See application file for complete search history.

(56) References Cited

U.S. PATENT DOCUMENTS

| | | | |
|---|---|---|---|
| 5,237,681 A | 8/1993 | Kagan et al. | 707/104.1 |
| 6,542,895 B1* | 4/2003 | DeKimpe et al. | |
| 6,546,395 B1 | 4/2003 | DeKimpe et al. | 707/101 |
| 6,651,073 B1 | 11/2003 | Lyle et al. | 707/202 |
| 7,080,081 B2 | 7/2006 | Agarwal et al. | 707/100 |
| 7,209,923 B1 | 4/2007 | Cooper | |
| 2003/0018644 A1 | 1/2003 | Bala et al. | 707/100 |
| 2005/0154765 A1* | 7/2005 | Seitz et al. | 707/104.1 |
| 2006/0218346 A1 | 9/2006 | Nagumo et al. | 711/114 |
| 2008/0098045 A1* | 4/2008 | Radhakrishnan | G06F 17/30551 |
| 2010/0095270 A1* | 4/2010 | Seitz et al. | 717/108 |

FOREIGN PATENT DOCUMENTS

JP   2007065978   3/2007   ............. G06F 12/00

OTHER PUBLICATIONS

Hunter, "Dropping a column from a table—(Oracle 8i and higher)," http://www.idevelopment.info/data/Oracle/DBA_tips/Database_Administration/DBA_36.shtml, copyright 1998 2009 by Jeffrey M. Hunter (last modified Jan. 2006), 3 pages.

(Continued)

*Primary Examiner* — Joshua Bullock
(74) *Attorney, Agent, or Firm* — Van Leeuwen & Van Leeuwen; Richard A. Wilhelm (57) ABSTRACT

An approach is provided that receives an alteration request to mark a selected column in a database table as an unused column. A database control table is then updated to indicate that the selected column is unused. After the database control table is updated, when a read request is received for the selected column, the same data is returned for the selected column for each row being read and this data is not stored in the database table.

6 Claims, 7 Drawing Sheets

(56) References Cited

OTHER PUBLICATIONS

"Dropping Tables," http://www.cs.umbc.edu/help/oracle8/server.815/a67772/tables.htm#1451, Oracle 8i Administrator's Guide, Chapter 14, Release 8.1.5, Copyright Oracle Corporation 1999, 2 pages . . .

* cited by examiner

ADAPTIVE RELATIONAL DATABASE ACCESS

RELATED APPLICATION

This application is a continuation of U.S. application Ser. No. 12/748,943, filed Mar. 29, 2010, titled "Adaptive Relational Database Access," and having the same inventors as the above-referenced application.

BACKGROUND OF THE INVENTION

A traditional database management system (DBMS) stores data in tables with the tables containing rows and columns of data. A column of data is generally of a particular type, such as "name," "address," etc. while the rows generally pertain to a record, such as a particular customer. Software applications use data manipulation instructions, such as the Structured Query Language (SQL) to insert, extract, or manipulate data in database tables. Because database tables often contain vast amounts of data, reducing the size of a particular column, or eliminating it altogether, can sometimes dramatically reduce the size of a particular table. Columns cannot, however, be eliminated from traditional database tables without impacting software applications that access the table and reference the column of data.

SUMMARY

An approach is provided that receives an alteration request to mark a selected column in a database table as an unused column. A database control table is then updated to indicate that the selected column is unused. After the database control table is updated, when a read request is received for the selected column, the same data is returned for the selected column for each row being read and this data is not stored in the database table.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
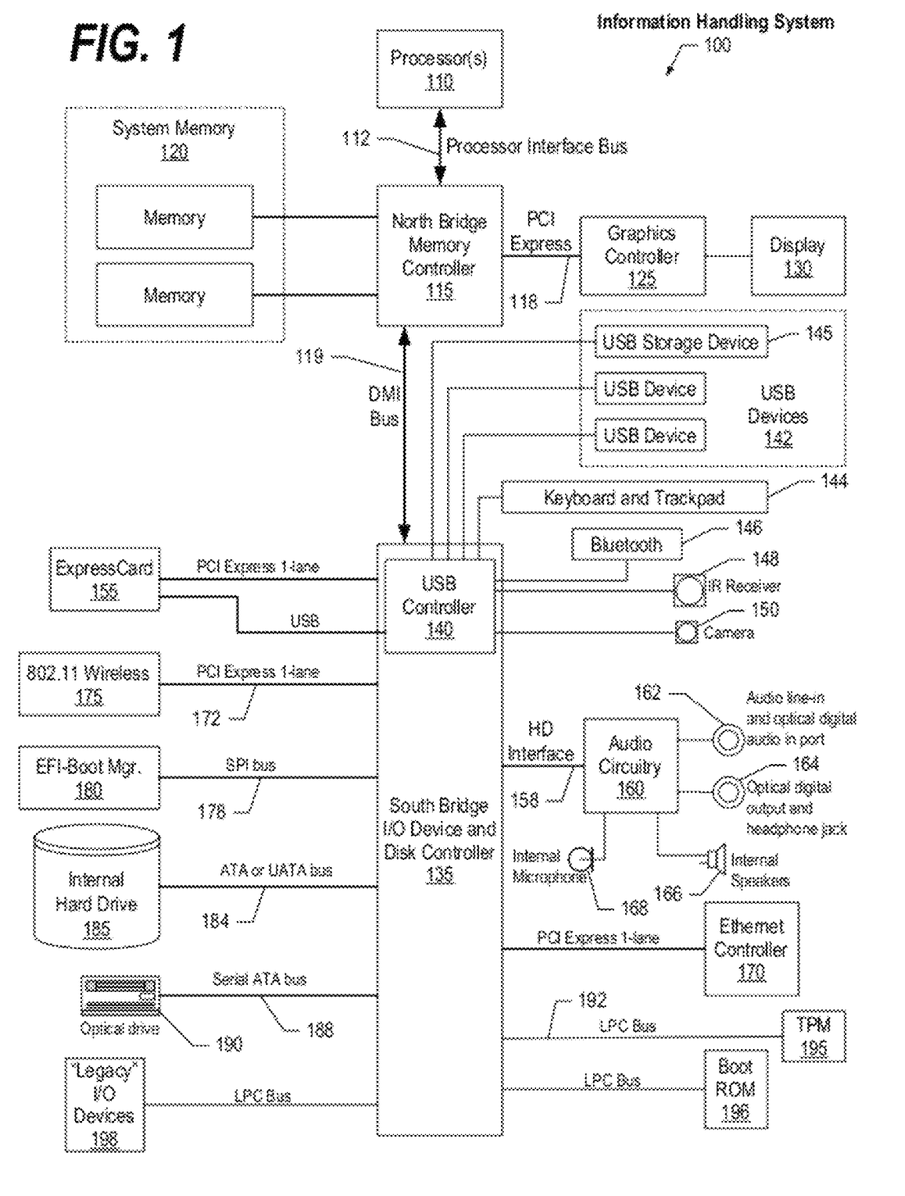
FIG. 1 is a block diagram of a data processing system in which the methods described herein can be implemented.
Figure 2:
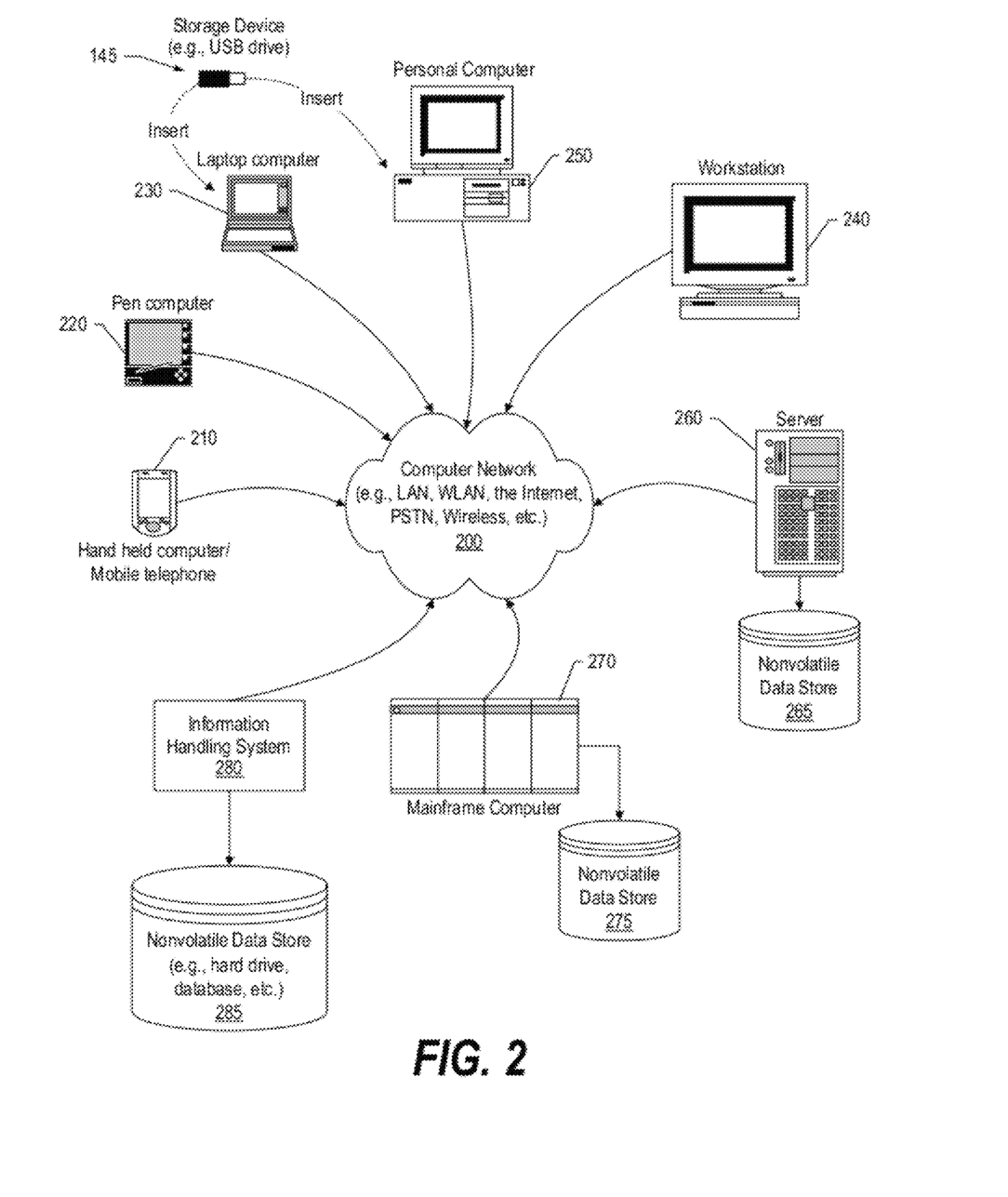
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Extensible Firmware Interface (EFI) manager 180 connects to Southbridge 135 via Serial Peripheral Interface (SPI) bus 178 and is used to interface between an operating system and platform firmware. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
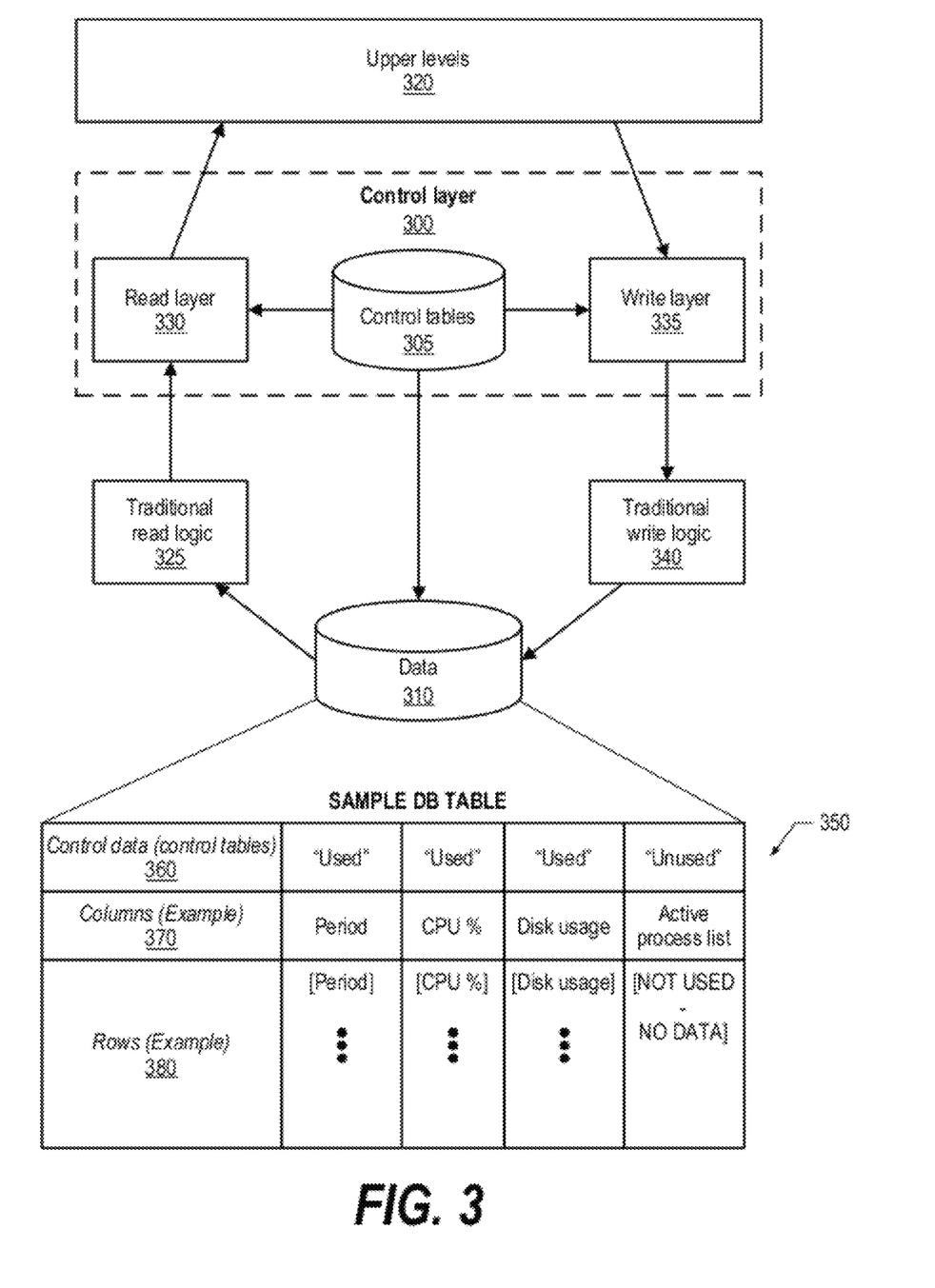
FIG. 3 is a diagram depicting various layers, including a control layer, in a database management system.

FIG. 3 is a diagram depicting various layers, including a control layer, in a database management system. Control layer 300 includes one or more control tables 305, read layer logic 330, and write layer logic 335. Read layer logic 330 interfaces with upper level database application programs 320 and traditional database read logic 325. When a read request is received, read layer 330 identifies, using control tables 305, whether one or more of the columns included in the read request are "unused" columns. If the columns are unused, read layer 330 provides the responsive data for the column(s) (e.g., "N/A," null value, "no data," etc.). The responsive data provided by read layer 330 will be the same for each row. Data for the other "used" columns will be retrieved from the database table (data 310) using traditional read logic 325. In this manner, programs in upper levels 320 expecting a particular "unused" column will still receive data for the unused columns and will not cause an error in the application program. Likewise, when an application program from upper levels 320 writes data to a table, write layer 335 receives the request, uses control tables 305 to determine whether the columns being written to are "used" or "unused," and, if any of the columns are "unused," then write layer logic 335 determines the data (if any) that will be provided to traditional write logic 340. Data for "used" columns pass through write layer logic 335 and are written to the database table (data 310) using traditional write logic 340. In this manner, columns that would otherwise consume storage and memory in the database table can be either substantially shortened or eliminated altogether. This can result in significant storage and memory savings in some situations, such as in sample database table 350 discussed below.

Sample database table 350 shows performance information stored for a system throughout a given period of time (e.g., a day, week, etc.). The columns 370 used in the example table include CPU % for a given period, along with the disk usage and active process list during that period. While CPU % and disk usage are rather small fields (columns), the active process list is a large field (column) that can store identifiers of many processes. Thus, the active process list column likely takes up much more space than the other columns. To address this concern, control data 360 is established in control tables 305. As shown, the control data indicates that the period, CPU % and disk usage columns are "used," while the active process list column is "unused." When data is captured and written to the database by a software program that is monitoring system performance, the software program will execute instructions to write the period, CPU %, the disk usage, and the active process list to the database table. The resulting rows (380) actually written to the database table will have the period, CPU % and the disk usage stored in table 350, however, because the active process list was marked as "unused," the data provided by the software program is not written to the table. Instead, either no data is written to the column (if the column does not exist), or write layer logic 335 substitutes a different value to store in the active process list column (e.g., "N/A," null value, etc.), thus saving space in table 350.

Figure 4:
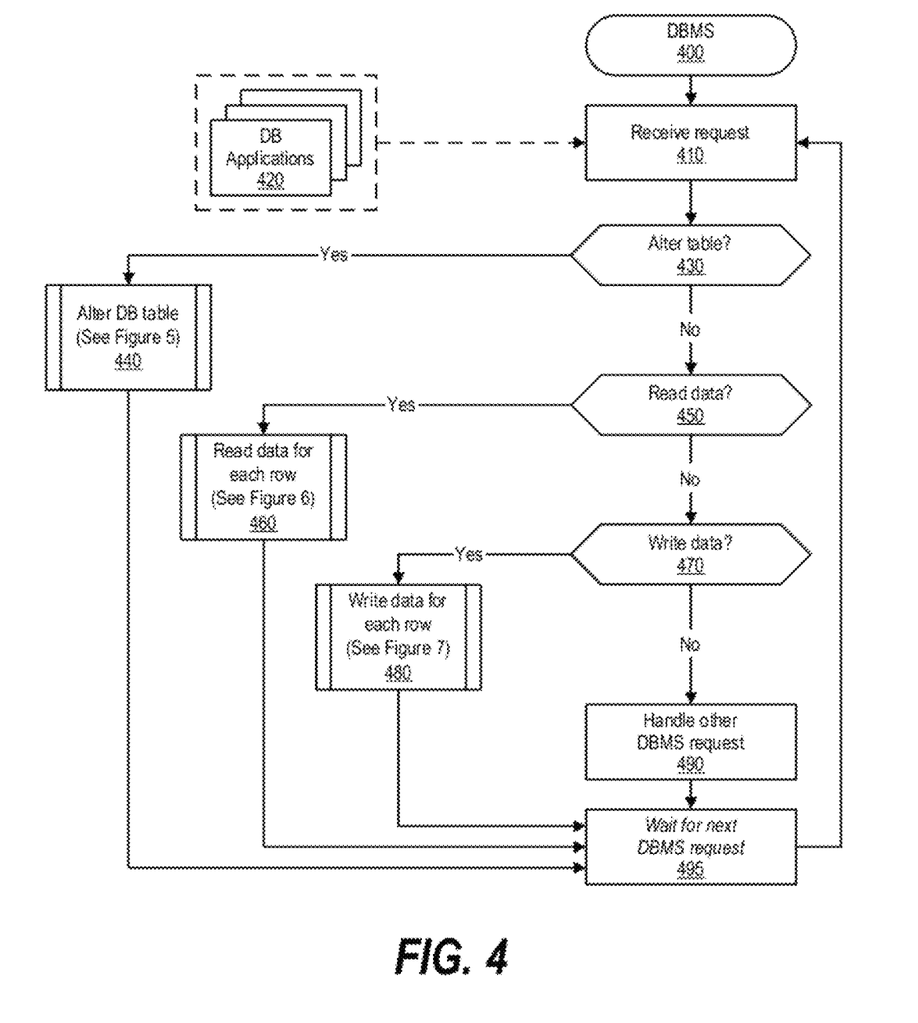
FIG. 4 is a high level flowchart showing how the database management system handles various requests.

FIG. 4 is a high level flowchart showing how the database management system handles various requests. Processing commences at 400 whereupon, at step 410, the database management system receives a request from software applications 420 that include database instructions (database applications). A determination is made as to whether the request is to alter a database table (decision 430). If the request is to alter a database table, then decision 430 branches to the "yes" branch whereupon, at predefined process 440, the alter database table routine is performed (see FIG. 5 and corresponding text for processing details). On the other hand, if the request is not to alter a table, then decision 430 branches to the "no" branch whereupon a determination is made as to whether the request is to read data from a database table (decision 450). If the request is to read data from a table, then decision 450 branches to the "yes" branch whereupon, at predefined process 460, a routine is performed to read data for each requested row of the requested table (see FIG. 6 and corresponding text for processing details). On the other hand, if the request is not to read data, then decision 450 branches to the "no" branch whereupon a determination is made as to whether the request is to write data to a database table (decision 470). If the request is to write data to a table, then decision 470 branches to the "yes" branch whereupon, at predefined process 480, a routine is performed to write data to each row of the requested table (see FIG. 7 and corresponding text for processing details). On the other hand, if the request is not to write data, then decision 470 branches to the "no" branch whereupon, at step 490, the database management system handles the other request which is not an alter, read, or write request. At step 495, the database management system waits for the next request to arrive. When the next request arrives, processing loops back to step 410 to receive the request and process it as outlined above.

Figure 5:
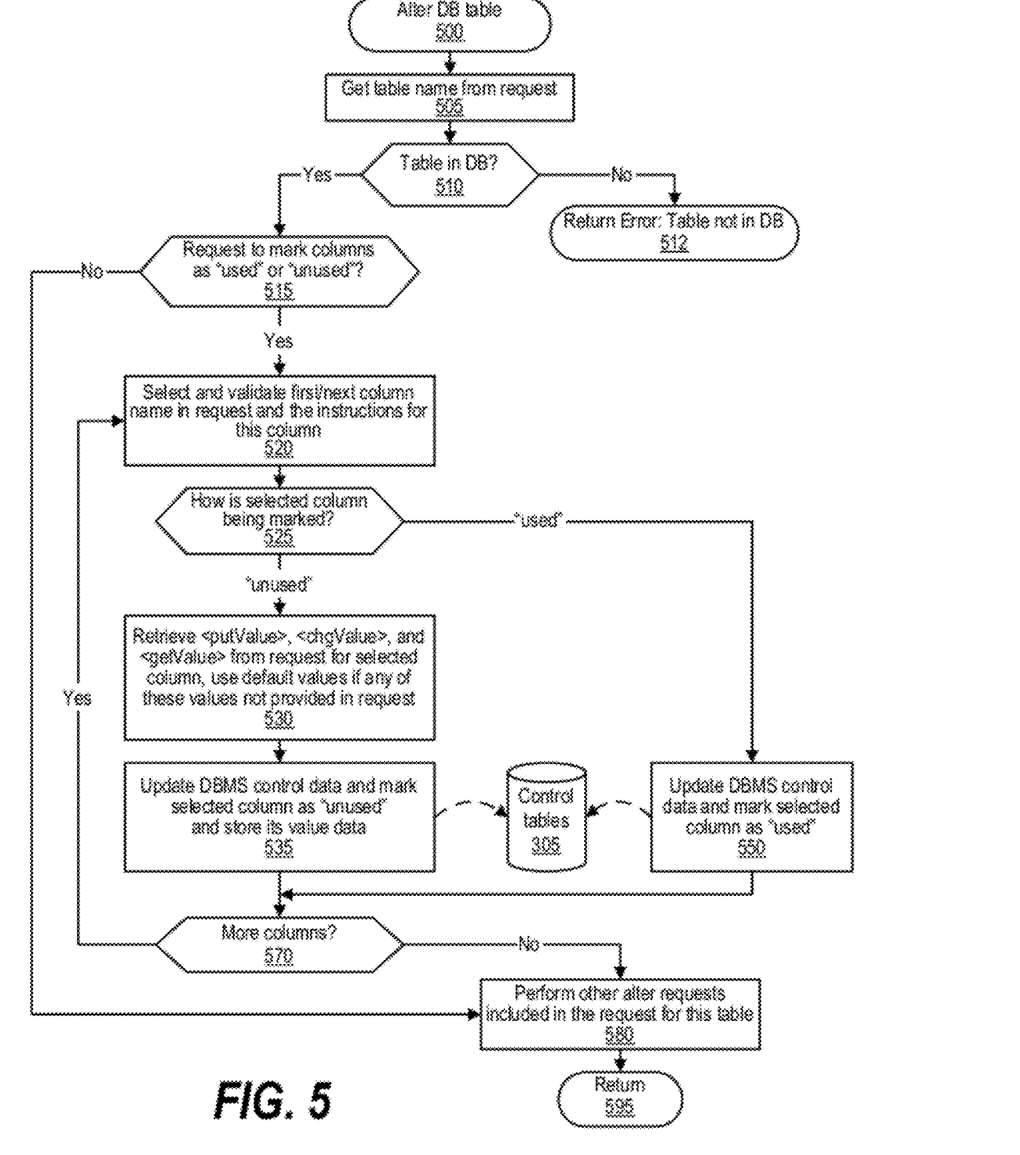
FIG. 5 is a flowchart showing details of how the database management system handles a request to alter a database table.

FIG. 5 is a flowchart showing details of how the database management system handles a request to alter a database table. Processing commences at 500 whereupon, at step 505, the routine retrieves the table name from the received request. A determination is made as to whether the table exists in the database (decision 510). If the table does not exist in the database, decision 510 branches to the "no" branch whereupon processing returns an error to the software application at 512 indicating that the table is not in the database and processing returns to the calling routine (see FIG. 4).

On the other hand, if the table is in the database, then decision 510 branches to the "yes" branch whereupon a determination is made as to whether the request includes any request(s) to mark one or more columns as either "used" or "unused" (decision 515). If the request does not include any request(s) to mark any columns as "used" or "unused," then decision 515 branches to the "no" branch whereupon the other alter request(s) is/are performed at step 580 after which processing returns to the calling routine at 595.

Returning to decision 515, if the alter request includes one or more requests to mark column(s) as either "used" or "unused," then decision 515 branches to the "yes" branch whereupon, at step 520, the first column name that is being marked as "used" or "unused" is selected and validated. If the column does not exist in the table, an error is returned and processing terminates. Otherwise, a determination is made as to whether the selected column is being marked as "unused" or as "used" (decision 525). If the selected column is being marked as "unused", then decision 525 branches to the "unused" branch whereupon, at step 530, various values are retrieved from the request (if provided) and, if values are not provided, then default values are used. These values include a "putValue" which is the value that will be provided to the traditional write logic when a new row is written to the table. These values also include a "chgValue" which is the value that will be provided to the traditional write logic when an existing row is being updated. Finally, these values include a "getValue" which is the value that will be returned for the selected column when the column is being read by a software application. At step 535, control tables 305 are updated to indicate that the selected column is "unused" as well as the values of the putValue, chgValue, and getValue associated with the selected column.

Returning to decision 525, if the selected column is being marked as "used," then decision 525 branches to the "used" branch. At step 550, control tables 305 are updated to indicate that the selected column is "used." In this manner, a column can be marked as "unused" and subsequently marked as "used" or vise-versa.

Following step 535 or 550, a determination is made as to whether there are more columns that are being marked as either "used" or "unused" in the alter request (decision 570). If there are more columns being marked, then decision 570 branches to the "yes" branch which loops back to select the next column in the request and process it as described above. This looping continues until there are not more columns that are being marked as either "used" or "unused," at which point decision 570 branches to the "no" branch whereupon, at step 580, any other alter requests (other than marking as "used" and "unused") are performed. Processing then returns to the calling routine (see FIG. 4) at 595.

Figure 6:
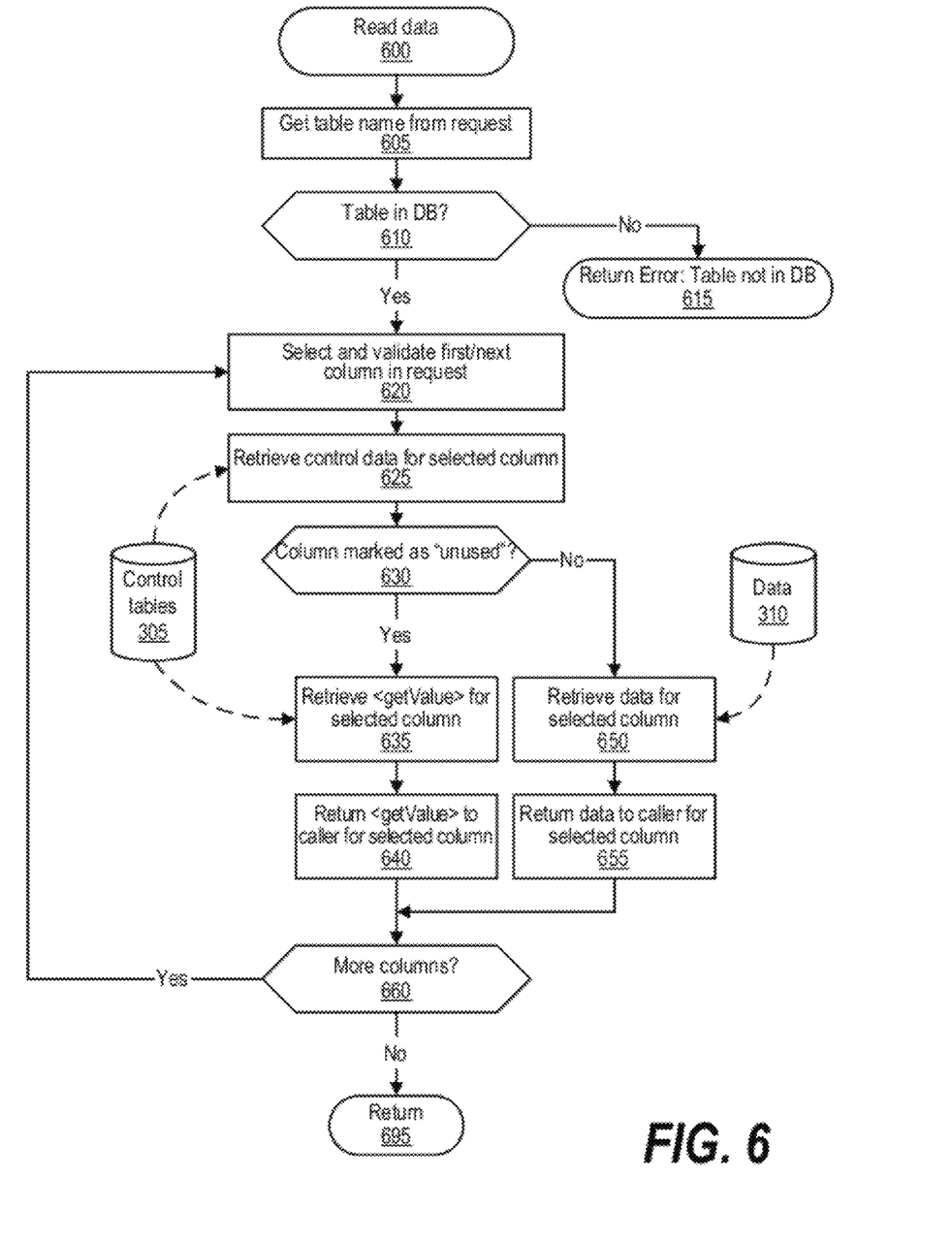
FIG. 6 is a flowchart showing details of how the database management system handles a request to read data from a database table.

FIG. 6 is a flowchart showing details of how the database management system handles a request to read data from a database table. Processing commences at 600 whereupon, at step 605, the table from which data is to be read is retrieved from the request. A determination is made as to whether the table exists in the database (decision 610). If the table does not exist in the database, decision 610 branches to the "no" branch whereupon processing returns an error to the software application at 615 indicating that the table is not in the database and processing returns to the calling routine (see FIG. 4).

On the other hand, if the table is in the database, then decision 610 branches to the "yes" branch whereupon, at step 620, processing selects and validates the first column included in the request. If the column does not exist in the table, an error is returned and processing terminates. Otherwise, at step 625, control data corresponding to the selected column is retrieved from control tables 305. A determination is made as to whether the selected column is marked as "unused" (decision 630). If the selected column is marked as "unused," then decision 630 branches to the "yes" branch whereupon, at step 635, processing retrieves the getValue from control tables 305 for the selected column and, at step 640, the retrieved getValue is returned to the calling software application. For example, if the column is a "Street Address" column that is marked as "unused" with a getValue of "N/A", then the value "N/A" is returned as the Street Address for each row returned from the database table.

Returning to decision 630, if the column is not marked as "unused" (and is therefore marked as "used"), then decision 630 branches to the "no" branch whereupon, at step 650, the actual data is retrieved from the database table for the requested row/column from data 310. This data is returned to the calling software application at step 655. Using the example from above, if the column is "Street Address" and the column is marked as "used," then the actual street address (e.g., "123 Main Street", etc.) is returned to the requesting software application.

Following step 640 or 665, a determination is made as to whether there are more columns being read in the request (decision 660). If there are more columns that are being read, then decision 660 branches to the "yes" branch which loops back to select the next column in the request and process it as described above. This looping continues until there are no more columns being read in the read request, at which point decision 660 branches to the "no" branch and processing returns to the calling routine (see FIG. 4) at 695.

Figure 7:
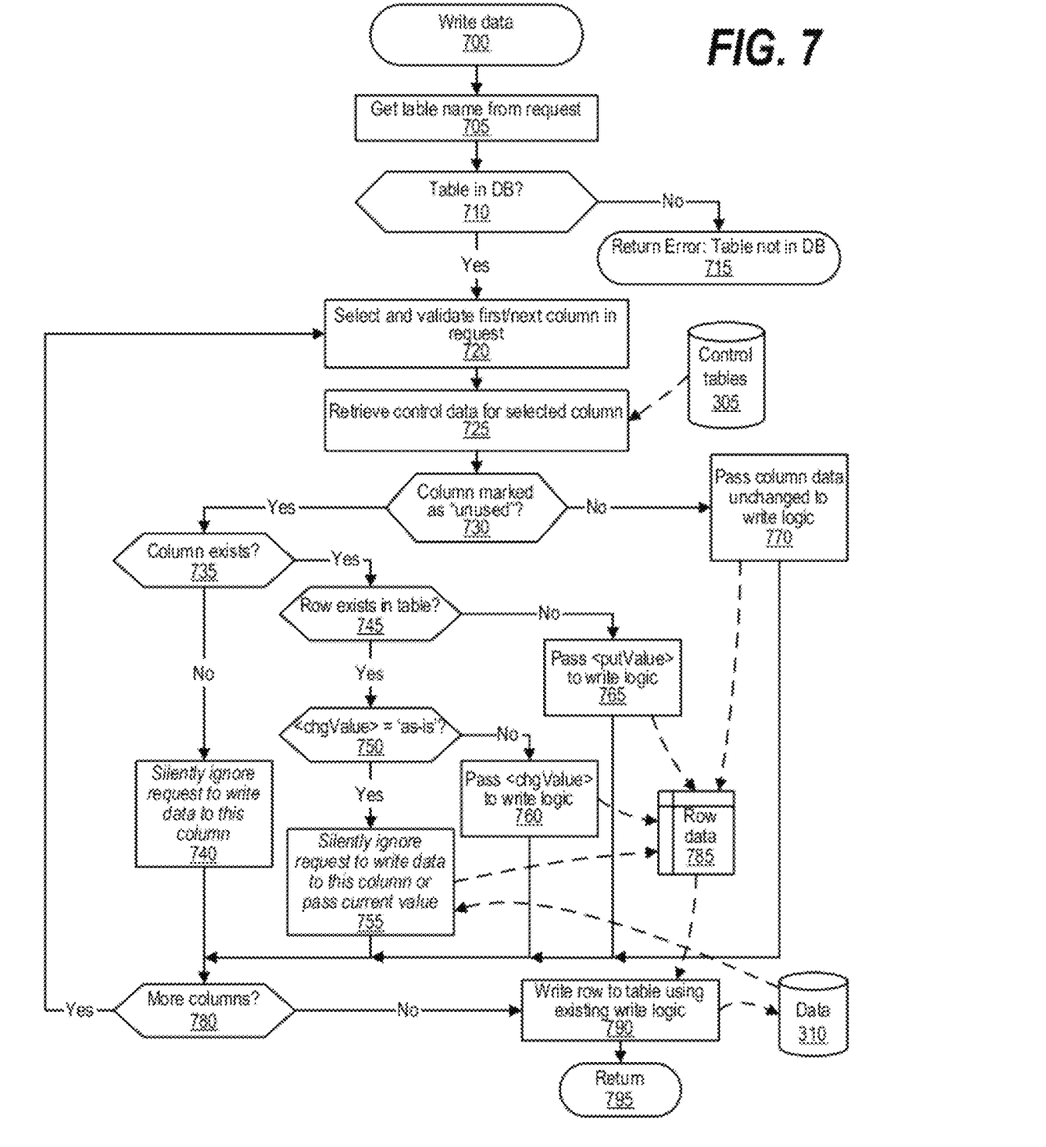
FIG. 7 is a flowchart showing details of how the database management system handles a request to write data to a database table.

FIG. 7 is a flowchart showing details of how the database management system handles a request to write data to a database table. Processing commences at 700 whereupon, at step 705, the table from which data is to be read is retrieved from the request. A determination is made as to whether the table exists in the database (decision 710). If the table does not exist in the database, decision 710 branches to the "no" branch whereupon processing returns an error to the software application at 715 indicating that the table is not in the database and processing returns to the calling routine (see FIG. 4).

On the other hand, if the table is in the database, then decision 710 branches to the "yes" branch whereupon, at step 720, processing selects and validates the first column included in the write request. If the column does not exist in the table, an error is returned and processing terminates. Otherwise, at step 725, control data corresponding to the selected column is retrieved from control tables 305. A determination is made as to whether the selected column is marked as "unused" (decision 730). If the selected column is marked as "unused," then decision 730 branches to the "yes" branch. A determination is made as to whether the column exists in the actual database table (decision 735). If the selected column does not exist, then decision 735 branches to the "no" branch whereupon, at step 740, processing silently ignores the request to write the data to this column. On the other hand, if the selected column exists in the database table, then decision 735 branches to the "yes" branch whereupon another determination is made as to whether the row exists in the database table (decision 745). If the row already exists (and is being updated), then decision 745 branches to the "yes" branch whereupon a determination is made as to whether the chgValue retrieved from control tables 305 is a special "as-is" value (decision 750). If the chgValue is the special "as-is" value, then decision 750 branches to the "yes" branch whereupon, at step 755, either the request to write data to the column is silently ignored or the current data for the column is passed as the data being written and stored in row data 785. On the other hand, if the chgValue is not the special "as-is" value, then decision 750 branches to the "no" branch whereupon, at step 760, the value of the chgValue retrieved from the control tables is passed to the traditional write logic and written to row data 785. For example, if the column is "Street Address" and the value of the retrieved chgValue is "N/A", then "N/A" is written to row data 785 as the Street Address rather than the value provided by the software application (e.g., "123 Main Street," etc.).

Returning to decision 745, if the row does not exist the table (indicating that a new row is being added to the table), then decision 745 branches to the "no" branch whereupon, at step 765, the value of the putValue retrieved from control data 305 is passed to write logic by writing the putValue to row data 785. While putValue can be the same value as the chgValue, it can also be different. Using the Street Address example from above, the putValue could be set as a null value and the chgValue set as the special "as-is" value, so that when new rows are added, the Street Address is set to a null value, but when an existing row is updated, the Street Address is set to left unchanged.

Returning to decision 730, if the column is not marked as "unused" (and is therefore marked as "used"), then decision 730 branches to the "no" branch whereupon, at step 770 the data provided in the request by the software application is passed unchanged to the traditional write logic by writing the data to row data 785. Using the example from above, if the column "Street Address" is marked as "unused" but the column "Last Name" is marked as "used" and the software program passes the last name of "Doe" in the write request, then this name ("Doe") is written to row data 785 for eventual writing to the database table.

After the first selected column ("used" or "unused") has been processed in step 740, 755, 760, 765 or 770, a determination is made as to whether there are more columns included in the write request (decision 780). If there are more columns in the write request, then decision 780 branches to the "yes" branch which loops back to step 720 to select the next column in the request and process it as described above. This looping continues until all columns that are included in the write request have been processed, at which point decision 780 branches to the "no" branch whereupon, at step 790, the row stored in row data 785 is written to the actual database table (data 310) using traditional database write logic. Processing then returns to the calling routine (see FIG. 4) at 795.

One of the intended implementations of the invention is a software application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
receiving a first alteration request to mark a selected column in a database table as an unused column, wherein the first alteration request includes a write value;
updating a database control table indicating that the selected column is unused and storing the write value in the database control table;
receiving a write request corresponding to the selected column, wherein the write request includes write data and identifies one or more rows to write in the database table;
in response to the selected column existing in the database table, writing the previously stored write value to the selected column of the one or more rows, wherein the write data included in the write request is not written to the selected column of the one or more rows;
in response to the selected column not existing in the database table, inhibiting writing of any data to the selected column of the one or more rows;
in response to receiving a second alteration request to mark the selected column in the database table as a used column:
updating the database control table indicating that that the selected column is used;
in response to receiving a read request to read a first set of one or more rows, retrieving a data stored in the selected column from the database table at the first set of rows; and
in response to receiving a second write request to write a provided data to a second set of one or more rows, writing the provided data to the selected column in the database table at the second set of rows.

2. The method of claim 1 further comprising:
determining that the selected column is unused by checking the database control table.

3. An information handling system comprising:
one or more processors;
a memory accessible by at least one of the processors;
a nonvolatile storage medium accessible by at least one of the processors;
a database management system including a set of instructions stored in the memory and executed by at least one of the processors in order to perform actions of:
receiving a first alteration request to mark a selected column in a database table as an unused column, wherein the first alteration request includes a write value;
updating a database control table indicating that the selected column is unused and storing the write value in the database control table;
receiving a write request corresponding to the selected column, wherein the write request includes write data and identifies one or more rows to write in the database table;
in response to the selected column existing in the database table, writing the previously stored write value to the selected column of the one or more rows, wherein the write data included in the write request is not written to the selected column of the one or more rows;
in response to the selected column not existing in the database table, inhibiting writing of any data to the selected column of the one or more rows;
in response to receiving a second alteration request to mark the selected column in the database table as a used column:
updating the database control table indicating that that the selected column is used;
in response to receiving a read request to read a first set of one or more rows, retrieving a data stored in the selected column from the database table at the first set of rows; and
in response to receiving a second write request to write a provided data to a second set of one or more rows, writing the provided data to the selected column in the database table at the second set of rows.

4. The information handling system of claim 3 wherein the actions further comprise:
determining that the selected column is unused by checking the database control table.

5. A computer program product comprising:
a non-transitory computer readable storage medium;
first program instructions to receive a first alteration request to mark a selected column in a database table as an unused column, wherein the first alteration request includes a write value;
second program instructions to update a database control table indicating that the selected column is unused and to store the write value in the database control table;

third program instructions to receive a write request corresponding to the selected column, wherein the write request includes write data and identifies one or more rows to write in the database table;
fourth program instructions to write the previously stored write value to the selected column of the one or more rows, wherein the write data included in the write request is not written to the selected column of the one or more rows, in response to the selected column existing in the database table;
fifth program instructions to inhibit writing of any data to the selected column of the one or more rows in response to the selected column not existing in the database table;
sixth program instructions to receive a second alteration request to mark the selected column in the database table as a used column;
seventh program instructions to update the database control table indicating that the selected column is used;
after the database control table is updated to indicate that the selected column is used:
eighth program instructions to receive a read request to read a first set of one or more rows;
ninth program instructions to retrieve a data stored in the selected column from the database table at the first set of rows;
tenth program instructions to receive a subsequent write request to write a provided data to a second set of one or more rows;
eleventh program instructions to write the provided data to the selected column in the database table at the second set of rows; and
wherein the first, second, third, fourth, fifth, sixth, seventh, eighth, ninth, tenth, and eleventh program instructions are stored on the non-transitory computer readable storage medium.

6. The computer program product of claim 5 further comprising:
twelfth program instructions to determine that the selected column is unused by checking the database control table; and
wherein the twelfth program instructions are stored on the non-transitory computer readable storage medium.

* * * * *